3,398,206
PRODUCTION OF p-DIALKYLBENZENES
Max Strohmeyer, Ludwigshafen (Rhine), Karl Hiller, Heidelberg, and Heinrich Scholz and Hubert Kindler, Ludwigshafen (Rhine), Germany, assignors to Badische Anilin- & Soda-Fabrik Aktiengesellschaft, Ludwigshafen (Rhine), Germany
No Drawing. Filed Aug. 18, 1966, Ser. No. 573,190
Claims priority, application Germany, Aug. 20, 1965, B 83,356
5 Claims. (Cl. 260—671)

ABSTRACT OF THE DISCLOSURE

The preparation of p-dialkylbenzenes by alkylation of an alkylbenzene with an olefin using a catalyst comprised of (1) aluminum chloride, (2) hydrogen chloride, and (3) an aromatic hydrocarbon which contains a carbon-carbon double bond in conjugation to a benzene nucleus.

---

This invention relates to a new process for the production of p-dialkylbenzenes from alkylbenzenes and olefins in the presence of an aluminum chloride catalyst.

It is known that aromatic hydrocarbons may be alkylated with olefins in the presence of Friedel-Crafts catalysts. If alkylbenzenes be reacted with olefins, the products formed are o-dialkylbenzenes, m-dialkylbenzenes, p-dialkylbenzenes and more highly alkylated products, the meta-isomers among the dialkylbenzenes being formed preferentially.

A number of methods have been recommended for influencing the isomer ratio in favor of the para-isomers, for example by varying the metal halide used as catalyst, by adding ethers to the Friedel-Crafts catalyst or by the use of polar solvents, such as nitromethane or carbon disulfide.

These methods are however unsatisfactory because simultaneously with the increase in selectivity there is a marked decrease in the reaction speed, undesirable new components pass into the reaction product or catalyst components have to be used which add considerably to the cost of the process. Moreover it is usually necessary to use different catalysts for the alkylation and the transalkylation in these methods.

It is an object of the present invention to provide a process for the production of p-dialkylbenzenes in which alkylation of alkylbenzenes with olefins takes place with high selectivity and high reaction speed, in which no undesirable new components pass into the reaction product, in which no catalyst components which add to the cost of the process are used, and in which it is not necessary to use different catalysts for the alkylation and the transalkylation.

These and other objects are achieved in a process for the production of p-dialkylbenzenes from alkylbenzenes and olefins in the presence of an aluminum chloride/hydrogen chloride catalyst by using as an additional catalyst component an aromatic hydrocarbon which contains a carbon-carbon double bond in conjugation to a benzene nucleus.

The new process gives high yields of p-dialkylbenzenes at high reaction speed. In many cases the additional catalyst component may be recovered as a byproduct in the transalkylation; thus it does not add to the cost of the process, nor does it introduce any new impurities into the reaction product. In contrast to the prior art methods, no ethylbenzene is formed as a byproduct in the production of p-diisopropylbenzene from cumene and propylene. Although in prior art methods ethylbenzene is formed only in traces, it accumulates in the usual continuous operation in which all the byproducts are returned to the process, so that an additional distilling column is required for its separation. The new process thus provides a saving in distillation costs.

Monoalkylbenzenes having branched and linear alkyl groups are suitable for the new process. In general those whose side chains bear one to twelve carbon atoms are used, such as toluene, ethylbenzene, propylbenzene, tertiary-butylbenzene, amylbenzenes, 2-ethylhexylbenzene, decylbenzenes and dodecylbenzenes. Isopropylbenzene is particularly suitable. The alkylbenzenes may be used in pure form, but commercial products may also be used which contain for example benzene, dialkylbenzenes and more highly alkylated benzenes, the proportion of the alkylbenzene preferably being more than 50 more percent or the commercial product having a ratio of alkyl groups present to benzene nuclei present from 0.6:1 to 1.4:1, preferably from 0.8:1 to 1.1:1. Commercial products of this kind are obtained for example by transalkylation of dialkylbenzenes and/or more highly alkylated benzenes with benzene in the presence of Friedel-Crafts catalysts.

Those olefins may be employed which are customarily used for Friedel-Crafts alkylations and which may contain either a linear or branched carbon chain, the double bond being terminal or mid-position. Olefins having two to twelve carbon atoms, such as ethylene, butylene, isobutylene, amylenes, hexenes, octenes, dodecenes and particularly propylene, are usually used.

As regards the aluminum chloride/hydrogen chloride catalyst used the new process does not differ from prior art alkylation reactions. In general 0.1 to 10%, preferably 0.3 to 5%, particularly 0.5 to 2%, by weight of aluminum chloride is used with reference to the alkylbenzene used. Hydrogen chloride is used in a small amount as a cocatalyst, generally from 0.01 to 1 mole per mole of aluminum trichloride. Obviously compounds which form hydrogen chloride under the reaction conditions, such as alkyl chlorides, may be used instead of hydrogen chloride.

Aromatic hydrocarbons which bear a carbon-carbon double bond in conjugation to a benzene nucleus are used as additional catalyst components in the new process. In general hydrocarbons having eight to twenty carbon atoms are used. The double bond may be present in an aliphatic side chain, as in the compounds styrene, α-methylstyrene, divinylbenzene, p-ethylstyrene or stilbene. The double bond may also be present in a ring, which may be condensed onto the benzene ring. Examples of such suitable compounds are naphthalene, methylnaphthalene, anthracene, naphthacene, acenaphthylene, phenalene, 3-phenylcyclohexene and particularly indene and alkyl-substituted indenes, such as 1,1-dimethylindene and 1,1,3-trimethyl-5-isopropylindene. The aromatic hydrocarbon is in general used in an amount of 0.2 to 20, preferably 0.5 to 10, particularly 1 to 5, moles per mole of aluminum chloride.

Alkylation is carried out in the usual temperature range, for example from 0° to 150° C., preferably from 25° to 100° C. In general atmospheric pressure is used but increased pressure, for example up to 10 atmospheres gauge, may also be used.

The catalyst may be prepared by mixing its components, if desired in an inert solvent, such as carbon tetrachloride or carbon disulfide, and used in substance or on an inert carrier, such as aluminum oxide, alumina or silica gel, after removal of any solvent. The aromatic hydrocarbon may also be added to a catalyst oil obtained in known manner from aluminum chloride, hydrogen chloride and an alkylbenzene. In the preferred embodiment, the catalyst components are placed in the alkylbenzene. The oily catalyst phase is then formed, possibly after addition of a small amount of the olefin. The olefin is then added with vigorous stirring. In order substantially to avoid the formation of more highly alkylated products, the reaction is advantageously interrupted before the stoichiometric amount of the olefin has been reacted, advantageously at a conversion of 10 to 60%. When a commercial mixture containing benzene, alkylbenzene and more highly alkylated benzenes is used instead of pure alkylbenzene, the alkylation is advantageously interrupted when there is a ratio of alkyl groups present to benzene groups present of from 1.0:1 to 1.6:1, preferably 1.05:1 to 1.3:1 in the reaction mixture, the ratio being advantageously at least 0.1 higher than the ratio in the starting mixture. The reaction may be carried out batchwise or continuously.

The p-dialkylbenzene is isolated from the reaction mixture in the usual way, for example by distillation. The m-dialkylbenzene and o-dialkylbenzene formed as byproducts and the more highly alkylated products may be transalkylated in known manner, if desired with an addition of benzene or alkylbenzene, using Friedel-Crafts catalysts.

In many cases, under certain conditions, aromatic hydrocarbons which have carbon-carbon double bonds in conjugation to the benzene nucleus are formed in the said transalkylation. Thus for example 1,1,3-trimethyl-5-isopropylindene is formed from triisopropylbenzene under the action of aluminum chloride and hydrogen chloride. In the production of p-diisopropylbenzene therefore it is advantageous to use a part of the triisopropylbenzene obtained as a byproduct for the production of the necessary catalyst component. For this purpose for example the transalkylation of triisopropylbenzene with benzene in the molar ratio of from 1:1.5 to 1:4 in the presence of 0.5 to 3% by weight of aluminum chloride and 0.01 to 1 mole of hydrogen chloride per mole of aluminum chloride is carried out at such a temperature and with such a residence time that the transalkylation mixture has the necessary content of aromatic hydrocarbons having a carbon-carbon double bond in conjugation to a benzene nucleus for the following alkylation. The said content may easily be determined by gas chromatography of the transalkylation mixture. The temperature range used is from 50° to 120° C., particularly from 60° to 80° C., with residence times of from ten to five hundred minutes. The optimum temperature and residence time may easily be determined by preliminary experiment. The o-diisopropylbenzene and m-diisopropylbenzene obtained as byproducts in the production of p-diisopropylbenzene should also be transalkylated in the industrial process. This transalkylation (particularly with the use of 0.5 to 2 moles of benzene per mole of diisopropylbenzene so that the main product is cumene) is know in principle and may be carried out either separately or together with the transalkylation of the triisopropylbenzene in the same reactor.

It is preferable to carry out the transalkylation of the o-diisopropylbenzene and m-diisopropylbenzene with benzene in a separate reaction stage, the same Friedel-Crafts catalysts, particularly aluminum chloride and hydrogen chloride, being used. It is advantageous to use the catalyst which has previously been used for transalkylation of the triisopropylbenzenes, more catalyst being added if necessary. The temperature used is 50° to 150° C., particularly 60° to 80° C., at residence times of from ten to five hundred minutes. Since triisopropylbenzenes are freshly formed to a small extent in the transalkylation of diisopropylbenzenes, this reaction may be controlled in such a way, possibly by the use of higher temperatures and longer residence times (whose optima are readily determined by preliminary experiment), that there is present in the reaction mixture an amount of an aromatic compound having a carbon-carbon double bond in conjugation to a benzene nucleus which is sufficient for the subsequent alkylation of cumene with propylene. These isomerization reaction mixtures may be used direct, without further addition of any kind of catalyst component, for the further reaction of alkylbenzenes with olefins. Obviously fresh catalyst may be added in the alkylation using such an isomerization reaction mixture containing catalyst, but it is by no means necessary. In the continuous production of p-diisopropylbenzene from cumene and propylene (wherein cumene is obtained from the undesirable byproducts by transalkylation with benzene) a good yield may be obtained even when the high-boiling residue obtained in the distillation after separating the triisopropylbenzene (which contains 1,1,3-trimethyl-5-isopropylindene among other products) is returned to the reaction. While it is true that these products are normally obtained only in minimal amounts, yet the content thereof may increase by constant return into the cycle to such an extent that the desired amount of aromatic hydrocarbon, i.e. about 0.2 to 20 moles per mole of aluminum chloride, is present in the reaction mixture.

After reaction is completed, the catalyst is separated or decomposed with water and the p-dialkylbenzene is isolated by distillation. Unreacted alkylbenzene is advantageously returned to the reaction. o-Dialkylbenzenes and m-dialkylbenzenes and more highly alkylated benzenes formed as byproducts may be substantially converted by transalkylation in known manner into alkylbenzenes and also returned into the reaction.

The invention is illustrated by the following examples. The percentages given in the examples are percentages by weight unless otherwise stated.

Example 1

400 ml. of cumene and 20 g. of styrene are placed in a stirred vessel at 75° C., 10 ml. of an aluminum chloride/hydrogen chloride catalyst oil (prepared from 200 g. of cumene and 100 g. of aluminum chloride by passing in hydrogen chloride at 25° to 75° C. until saturation is reached) is introduced and gaseous propylene is passed in, in an amount of 20 liters per hour.

After 0.4 mole of propylene has been added per mole of cumene, the reaction is stopped and the catalyst complex is decomposed by adding water. The organic phase of the reaction product has the following composition:

| | Percent |
|---|---|
| Benzene | 2.2 |
| Cumene | 49.1 |
| m-Diisopropylbenzene (m-DIPB) and o-DIPB | 18.9 |
| p-DIPB | 21.3 |
| 1,3,5-triisopropylbenzene (TIPB) | 6.1 |
| 1,2,4-TIPB | 2.4 |

This composition is equivalent to a content of 53% of p-DIPB in the DIPB fraction.

If the same experiment be carried out without adding styrene, a mixture having the following composition is obtained:

| | Percent |
|---|---|
| Benzene | 8.4 |
| Cumene | 37.6 |
| m- and o-DIPB | 29.3 |
| p-DIPB | 16.7 |
| 1,3,5-TIPB | 8.0 |
| 1,2,4-TIPB | trace |

This is equivalent to a content of 36.2% of p-DIPB in the DIPB fraction.

Example 2

The procedure of Example 1 is followed but 20 g. of anthracene is used instead of styrene and the reaction is stopped after 0.32 mole of propylene has been added per mole of cumene.

The reaction product has the following composition:

|  | Percent |
| --- | --- |
| Benzene | 0.6 |
| Cumene | 63.0 |
| m-DIPB | 10.2 |
| o-DIPB | 3.1 |
| p-DIPB | 16.1 |
| 1,3,5-TIPB | 1.0 |
| 1,2,4-TIPB | 6.0 |

This is equivalent to a content of 55% of p-DIPB in the DIPB fraction.

Example 3

A catalyst is prepared at 0° C. by dissolving 25 g. of indene in 100 ml. of carbon tetrachloride and adding 23 g. of aluminum chloride in portions. The carbon tetrachloride is evaporated at subatmospheric pressure and a coarsely crystalline brittle composition remains which is powdered.

10 g. of the catalyst thus prepared is added to 400 ml. of cumene and propylene is passed in at 75° C. at the rate of 20 liters per hour. The reaction is stopped after 0.38 mole of propylene has been added per mole of cumene.

The reaction product has the following composition:

|  | Percent |
| --- | --- |
| Benzene | 2.3 |
| Cumene | 51.4 |
| m- and o-DIPB | 19.5 |
| p-DIPB | 19.7 |
| 1,3,5-TIPB | 5.4 |
| 1,2,4-TIPB | 1.7 |

This is equivalent to a content of 50% of p-DIPB in the DIPB fraction.

Example 4

10 g. of a complex composed of 1 mole of aluminum chloride, 1 mole of 1,1,3-trimethyl-5-isopropylindene and 0.5 mole of hydrogen chloride is dissolved in 200 ml. of carbon tetrachloride. 20 g. of aluminum oxide powder is introduced into this solution with vigorous stirring. The solvent is then removed at subatmospheric pressure.

The catalyst thus obtained is dried and stirred with 400 ml. of cumene and at 50° C. propylene is passed in at the rate of 20 liters per hour. The reaction is stopped after 0.32 mole of propylene has been added per mole of cumene.

The reaction product has the following composition:

|  | Percent |
| --- | --- |
| Benzene | 0.5 |
| Cumene | 64.2 |
| m- and o-DIPB | 12.3 |
| p-DIPB | 15.2 |
| 1,3,5-TIPB | 1.6 |
| 1,2,4-TIPB | 5.5 |
| 1,2,4,5-tetraIPB | 0.7 |

This is equivalent to a content of 55% of p-DIPB in the DIPB fraction.

Example 5

25 g. of 1,1,3-trimethyl-5-isopropylindene is dissolved in 100 g. of hexane in a stirred vessel, heated to 40° C. and 28 g. of aluminum chloride is added while passing in hydrogen chloride to saturation point. A catalyst oil is obtained which is separated from the upper hexane layer.

3.6 g. of this catalyst oil is reacted with propylene in 360 g. of cumene at 50° C. After 0.4 mole of propylene has been passed in per mole of cumene, the reaction is stopped.

The reaction product has the following composition:

|  | Percent |
| --- | --- |
| Benzene | 0.2 |
| Cumene | 56.0 |
| o- and m-DIPB | 17.8 |
| p-DIPB | 17.8 |
| 1,3,5-TIPB | 6.9 |
| 1,2,4-TIPB | 1.3 |

This is equivalent to a content of 50% of p-DIPB in the DIPB fraction.

Example 6

In continuous operation, a stirred vessel provided with an overflow and having a capacity of 18 cubic meters is supplied while stirring at 75° C. with 1680 kg. of benzene, 2200 kg. of triisopropylbenzene, 55 kg. of aluminum chloride and 6 cu. m. of hydrogen chloride per hour.

The mixture leaving the vessel has a content of 0.5 to 1% of 1,1,3-trimethyl-5-isopropylindene and is continuously reacted in a second stirred vessel having a capacity of 18 cu. m. at 75° C. with 2450 kg. of benzene, 5100 kg. of m-diisopropylbenzene, 55 kg. of aluminum chloride and 6 cu. m. of hydrogen chloride per hour. The reaction mixture leaving the second vessel has the following composition, disregarding the content of aluminum chloride and hydrogen chloride:

|  |  | Percent |
| --- | --- | --- |
| Benzene | percent | 17.8 |
| Cumene | do | 47.2 |
| o- and m-DIPB | do | 18.8 |
| p-DIPB | do | 10.8 |
| 1,3,5-TIPB | do | 1.9 |
| 1,2,4-TIPB |  | trace |
| 1,1,3-trimethyl-5-isopropylindene | percent | 0.86 |

The reaction mixture (11,558 kg. per hour) leaving the second vessel (and which contains about 3% of catalyst oil as an emulsion) is reacted in a third vessel at 65° to 75° C. with 23,000 kg. of cumene and 4,100 liters of liquid propylene per hour. The reaction mixture leaving the last vessel has (after hydrolysis) the following composition:

|  | Percent |
| --- | --- |
| Benzene | 5.2 |
| Cumene | 61.5 |
| o- and m-DIPB | 16.7 |
| p-DIPB | 13.6 |
| 1,3,5-TIPB | 2.2 |
| 1,2,4-TIPB | 0.8 |

After the catalyst has been separated, the reaction mixture is distilled. Benzene, cumene, o- and m-DIPB and the TIPB's are returned to the reaction (vessel 1 and vessel 2).

We claim:

1. In a process for the production of p-dialkylbenzenes by reaction of an alkylbenzene with an olefin in the presence of an aluminum chloride/hydrogen chloride catalyst, the improvement which comprises using as an additional component of the catalyst an aromatic hydrocarbon which contains a carbon-carbon double bond in conjugation to a benzene nucleus.

2. A process as claimed in claim 1 in which the aromatic hydrocarbon contains from eight to twenty carbon atoms.

3. A process as claimed in claim 1 in which the said aromatic hydrocarbon is used in an amount of 0.2 to 20 moles per mole of aluminum chloride.

4. A process as claimed in claim 1 wherein said alkylbenzene is cumene, said olefin is propylene, and said aromatic hydrocarbon is 1,1,3-trimethyl-5-isopropylindene, and wherein 1,1,3-trimethyl-5-isopropylindene is produced in a transalkylation reaction of at least one of the compounds triisopropylbenzene, m-diisopropylbenzene and o-diisopropylbenzene in the presence of an aluminum chloride/hydrogen chloride catalyst.

5. In a process for the production of p-dialkylbenzenes by reaction of an alkylbenzene whose alkyl group contains one to twelve carbon atoms with an olefin containing two to twelve carbon atoms in the presence of 0.1 to 10% by weight of aluminum chloride on the alkylbenzene, and hydrogen chloride in an amount of 0.1 to 1 mole per mole of aluminum chloride at a temperature of from 0° to 150° C. and a pressure of from 0 to 10 atmospheres gauge, the improvement which consists in using as an additional component of the catalyst an aromatic hydrocarbon which contains a carbon-carbon double bond which is situated in conjugation to a benzene nucleus.

References Cited
UNITED STATES PATENTS 2,740,819    4/1956    Kirkland.
3,197,517    7/1965    Soderquist et al.

DELBERT E. GANTZ, *Primary Examiner.*
C. R. DAVIS, *Assistant Examiner.*